US010652959B2

United States Patent
Vedani et al.

(10) Patent No.: US 10,652,959 B2
(45) Date of Patent: May 12, 2020

(54) SWITCHING CONVERTER CIRCUIT

(71) Applicant: LEDCOM INTERNATIONAL S.R.L., Milan (IT)

(72) Inventors: Silvio Vedani, Calolziocorte (IT); Massimo Santi, Carate Brianza (IT)

(73) Assignee: LEDCOM INTERNATIONAL S.R.L., Milan (IT)

( * ) Notice: Subject to any disclaimer, the term of this patent is extended or adjusted under 35 U.S.C. 154(b) by 21 days.

(21) Appl. No.: 16/096,483

(22) PCT Filed: Apr. 21, 2017

(86) PCT No.: PCT/IB2017/052314
§ 371 (c)(1),
(2) Date: Oct. 25, 2018

(87) PCT Pub. No.: WO2017/187309
PCT Pub. Date: Nov. 2, 2017

(65) Prior Publication Data
US 2019/0141803 A1 May 9, 2019

(30) Foreign Application Priority Data
Apr. 29, 2016 (IT) .................. 102016000044195

(51) Int. Cl.
*H05B 33/08* (2020.01)
*H02M 1/08* (2006.01)
(Continued)

(52) U.S. Cl.
CPC .......... *H05B 33/0815* (2013.01); *H02M 1/08* (2013.01); *H02M 3/33523* (2013.01);
(Continued)

(58) Field of Classification Search
CPC .... H05B 33/02; H05B 33/08; H05B 33/0803; H05B 33/0815; H05B 33/0818;
(Continued)

(56) References Cited

U.S. PATENT DOCUMENTS

2008/0197817 A1* 8/2008 Colbeck .............. H02M 1/4225
323/205
2009/0146575 A1 6/2009 Chu et al.
(Continued)

FOREIGN PATENT DOCUMENTS

| EP | 2770623 A1 | 8/2014 |
| WO | 2016058021 A2 | 4/2016 |

*Primary Examiner* — Jason Crawford
(74) *Attorney, Agent, or Firm* — Browdy and Neimark, PLLC

(57) ABSTRACT

A switching converter circuit comprises at least an input terminal (IN1) for connecting to a continuous voltage source (VDCbus), an integrated control circuit (20), a pair of field effect transistors (QH, QL) connected to the integrated control circuit (20), a pair of coupled inductors (10) connected to the pair of field effect transistors (QH, QL), a diode (D) connected to the pair of field effect transistors (QH, QL), a pair of capacitors (Cn, Cled), and a first output terminal (OUT1). The converter circuit (1) further comprises a control loop (100) for controlling a current in output from the circuit via the first output terminal (OUT1).

9 Claims, 4 Drawing Sheets

(51) Int. Cl.
*H02M 3/335* (2006.01)
*H02M 1/00* (2006.01)
*H02M 7/48* (2007.01)

(52) U.S. Cl.
CPC .... H02M 3/33569 (2013.01); H05B 33/0818 (2013.01); H05B 33/0851 (2013.01); *H02M 2001/0009* (2013.01); *H02M 2007/4815* (2013.01); *Y02B 70/1441* (2013.01)

(58) Field of Classification Search
CPC . H05B 33/0848; H05B 33/0851; H02M 1/08; H02M 2001/0003; H02M 2001/0009
See application file for complete search history.

(56) References Cited

U.S. PATENT DOCUMENTS

| | | | |
|---|---|---|---|
| 2010/0320934 A1* | 12/2010 | Liu | H02M 1/4258 |
| | | | 315/294 |
| 2012/0194078 A1* | 8/2012 | Ren | H05B 33/0818 |
| | | | 315/122 |
| 2014/0009084 A1 | 1/2014 | Veskovic | |
| 2014/0091718 A1* | 4/2014 | Brinlee | H05B 33/0815 |
| | | | 315/185 R |

\* cited by examiner

SWITCHING CONVERTER CIRCUIT

TECHNICAL FIELD

The present invention relates to the sector of LED (Light Emitting Diode) light sources, and in particular the sector of power supplies of medium and high power LED light sources. The invention has been developed with particular regard, though not limitedly, to a switching converter circuit, i.e. a switching converter, particularly suitable for use as a second stage of power conversion, or output stage, of a power supply for LED light sources.

PRIOR ART

In the sector of power supplies for medium and high-power LED light sources, for example with power of greater than 50 Watt, use is known of power supplies with two or three stage topologies, in which the insulation stage is commonly a flyback switching converter or an LLC resonant converter.

Two-stage power supplies are emphatically the most interesting as they provide high efficiency and low costs, but have some drawbacks. Two-stage power supplies realised with a switching converter in LLC resonant technology require complex controllers and provide a limited output voltage dynamic. Two-stage power supplies realised with a flyback switching converter are characterised by lower efficiency, a limited reliability due to high electric stress on the components produced by the high voltages caused by the parasitic parameters of the components, and a high cost of the integrated control circuits necessary for managing these drawbacks. The choice between the use of a second stage with LLC technology or one with flyback technology is therefore determined by a choice of compromise between output voltage dynamic, efficiency and reliability of the converter.

One of the solutions adopted in the prior art is that of inserting a third stage of post-regulation. However, the use of this third stage leads to a drastic reduction in the efficiency of the power supply and an increase in terms of costs and dimensions.

Numerous experiments carried out by the applicant have revealed the need to realise a switching converter circuit which can obviate the above-described choice of compromise, in terms of performance, between the flyback and LLC technologies.

One of the main aims of the present invention is to satisfy this need.

A further aim of the invention is to realise a switching converter circuit which enables obviating all the drawbacks of converter circuits for LED light sources of known type.

A further aim of the invention is to improve the performance of power supplies for medium and high power LED light sources, used for example for powering class II lighting devices.

A further aim of the invention is to improve the reliability of a power supply for LED light sources of known type.

A further aim of the invention is to reduce the manufacturing costs of a power supply for LED light sources.

DESCRIPTION OF THE INVENTION

An embodiment of the present invention discloses a switching converter circuit comprising at least an input terminal for connecting to a continuous voltage source, an integrated control circuit, a pair of field effect transistors connected to the integrated control circuit, a pair of coupled inductors connected to the pair of field effect transistors, a diode connected to the pair of field effect transistors, a pair of capacitors, a first output terminal, and a control loop for controlling the current in output from the circuit via the first output terminal.

With this solution it is possible to realise a circuit of a switching converter with constant voltage to constant current able to guarantee a high degree of galvanic insulation.

In a further aspect of the present invention, the circuit comprises a second output terminal and a measure resistance connected in series to the second output terminal.

With this solution it is possible to control a current of the circuit by measuring the voltage at the heads of the measuring resistance.

In a further aspect of the invention the integrated control circuit is an integrated circuit for hysteretic control of the current.

With this solution it is possible to obtain a considerable reduction in manufacturing costs and complexity of a power supply comprising a switching converter realised with the circuit of the present invention.

In a further aspect of the present invention the converter circuit comprises a pair of MOSFET connected to the integrated circuit.

With this solution the efficiency of the switching converter circuit is very high as the switchings of the MOSFET occur at nil voltage and the intrinsic diodes of each MOSFET begin to conduct before the switching on of the MOSFET, thus preventing dissipation of power due to the evacuations of the junctions.

In a further aspect of the invention, the control loop comprises a first input connected to the pair of field effect transistors, a second input connected to the measure resistance, and an output connected to the integrated control circuit.

With this solution the current in output from the circuit can be controlled using a voltage as a control magnitude, and thus follow the hysteretic control methods of known type.

In a further aspect of the present invention the control loop comprises:
  a high pass filter connected to the first input terminal,
  a low pass filter connected to the high pass filter,
  a first amplification block connected to the low pass filter, and
  a summing node connected to the first amplification block.

In a further aspect of the present invention the control loop comprises:
  a second amplification block connected to the second input terminal,
  an optoisolator connected to the second amplification block and the summing node.

With this solution it is possible to obtain a waveform that is identical to that which would be obtained by a direct measuring of the current flowing in the magnetising inductance, and use it as a control input of the integrated circuit for the hysteretic control of the current.

A further aspect of the present invention comprises a decoupler stage of the signal connected to the optoisolator and the summing node.

A further aspect of the present invention relates to a LED light source power supply that comprises a switching converter circuit as defined in the present description.

With this solution it is possible to improve the performance and reduce the costs of the power supplies for medium and high-power LED light sources.

A further aspect of the present invention relates to a control method for a switching converter circuit comprising steps of:
  measuring a voltage on the terminal of the control loop connected to the node in common with the two MOSFET,
  subtracting, from the voltage measurement, the mean value via the high pass filter with a much greater time constant than the switching period,
  filtering, via the low pass filter, the waveform in output from the high pass filter with a much greater time constant than the switching period,
  amplifying, via the first amplification block, the waveform in output from the low pass filter, and
  sending, to the summing node, the waveform in output from the first amplification block.

A further aspect of the present invention includes steps of:
  measuring a current in output from the converter circuit by measuring the voltage at the heads of the measuring resistance,
  amplifying and filtering the measure of the voltage via the second amplification block,
  transmitting the waveform in output from the amplification block to the summing node via the optoisolator.

A further advantage of the present invention derives from the fact that the effects due to the overvoltages linked to the parasitic parameters of the pair of coupled inductors are manifested on the diode. The reliability of the switching converter circuit of the present invention is therefore considerably improved with respect to the traditional flyback topologies, where the parasitic effects are manifested on the MOSFET which is a more critical component from the point of view of overvoltages.

BRIEF DESCRIPTION OF THE DRAWINGS

Further characteristics and advantages of the present invention will emerge more fully from the following description, made by way of example with reference to the appended figures, in which.

BEST WAY OF CARRYING OUT THE INVENTION

Figure 1:
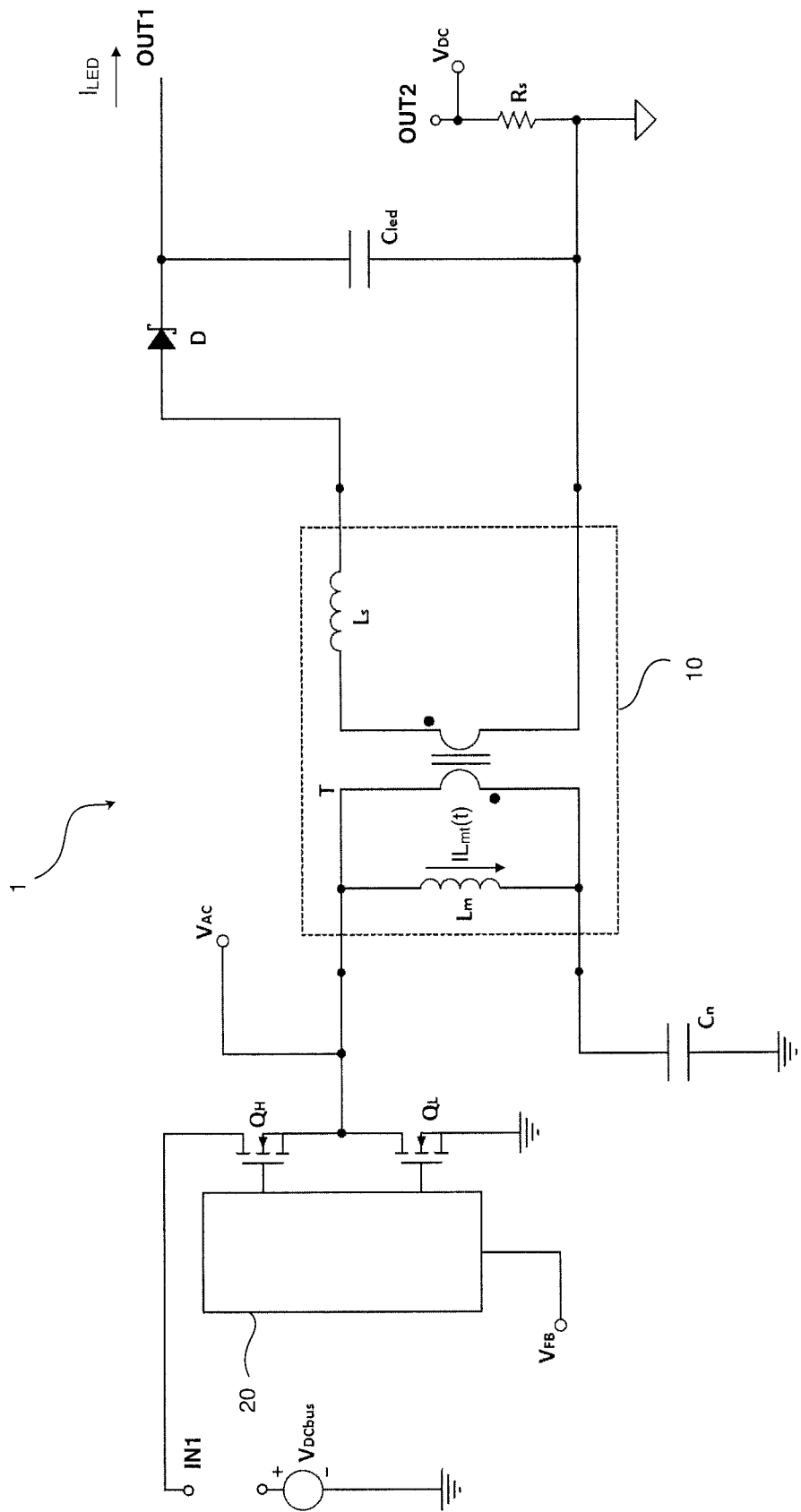
FIG. 1 is a schematic view of a switching converter circuit according to the present invention.

FIG. 1 illustrates an embodiment of an isolated switching converter circuit according to the present invention, denoted in its entirety by reference numeral 1, and which will be referred to for the sake of brevity in the following as the converter circuit 1.

The converter circuit 1 includes—at least an input terminal IN1, particularly suitable, in use, for connecting to an electric voltage source, in particular a continuous voltage source $V_{DCbus}$.

The converter circuit 1 includes a pair of coupled inductors 10, represented by the equivalent of a double-bipolar model which comprises an ideal transformer T, a magnetising inductance $L_m$ and a parasitic inductance $L_s$. The circuit converter 1 also includes a pair of field effect transistors, preferably a pair of MOSFET $Q_H$, $Q_L$, still more preferably a pair of MOSFET with n channels.

The circuit converter 1 further includes a diode D, a pair of capacitors $C_n$ and $C_{led}$ and a first output terminal OUT1, particularly suitable in use for connecting to an electrical load, preferably a light source, still more preferably a LED light source.

The first pole of the pair of coupled inductors 10 is connected to both the MOSFET $Q_H$, $Q_L$, the second pole of the pair of coupled inductors 10 is connected to the earth of the continuous voltage source via the capacitor $C_n$, i.e. the capacitor of the unloaded output.

The capacitor $C_{led}$, is connected between the third pole of the pair of coupled inductors 10, i.e. the mass of the secondary, and the cathode of the diode D, which coincides with the first output terminal OUT1. The diode D, i.e. the output diode, is connected between the first output terminal OUT1 and the fourth pole of the pair of coupled inductors.

In use, when the input terminal IN1 is connected to the continuous voltage source $V_{DCbus}$, during the on stage ($T_{on}$) only the MOSFET $Q_H$ is switched on so as to enable energy transfer from the continuous voltage source $V_{DCbus}$ towards the capacitor of the unloaded output $C_n$ and the magnetising inductance $L_m$. During the off stage ($T_{off}$) the MOSFET $Q_H$ switches off and the MOSFET $Q_L$ switches on and sends the diode D in conduction on the first output terminal OUT1, so as to enable energy transfer from the capacitor of the unloaded output $C_n$ and from the magnetising inductance $L_m$ to the output capacitor $C_{led}$ and the output through the ideal transformer T and the parasitic inductance $L_s$.

In a particularly advantageous characteristic of the present invention, the converter circuit 1 includes a current control system in order to be able to carry out, in use, both a power conversion and an output current control, thus passing from a continuous voltage in input, $V_{DCbus}(t)$, to a controlled direct current $I_{led}(t)$ in output.

In this sense, the circuit converter 1 of the present invention further comprises an integrated control circuit (20, connected to both the MOSFET field effect transistors, for controlling the current of the circuit converter 1, preferably for the hysteretic control of the current of the circuit converter 1. However, the integrated control circuit 20 alone is not sufficient for controlling the direct current $I_{led}(t)$ in output from the circuit converter 1.

In order better to understand the present invention, some of the applicant's considerations during the course of extended experimentation are included. The average value of the current $I_{Lm}(t)$ which flows in the magnetising inductance $L_m$, in a case in which the transformation ratio of the ideal transformer T is one, is equal to the average value of the output current $I_{led}(t)$ leaving the first output terminal OUT1.

However, it is necessary to consider the triangular waveform of the current $I_{Lm}(t)$ flowing in the magnetising inductance $L_m$. This current cannot be read using known-type reading devices, as mentioned, the magnetising inductance $L_m$ is not a real component but is a part of the model of the pair of coupled inductors and therefore is not accessible. In order to obtain a current control it has even been considered to carry out the control on the average value of the output current $I_{led}(t)$ which can be read by means of a measure resistance.

The current control system of the conversion circuit 1 of the present invention therefore comprises a control loop 100, preferably a retroactive control loop, and a measure resistance $R_s$ connected to a second output terminal OUT2 of the conversion circuit 1.

Figure 2:
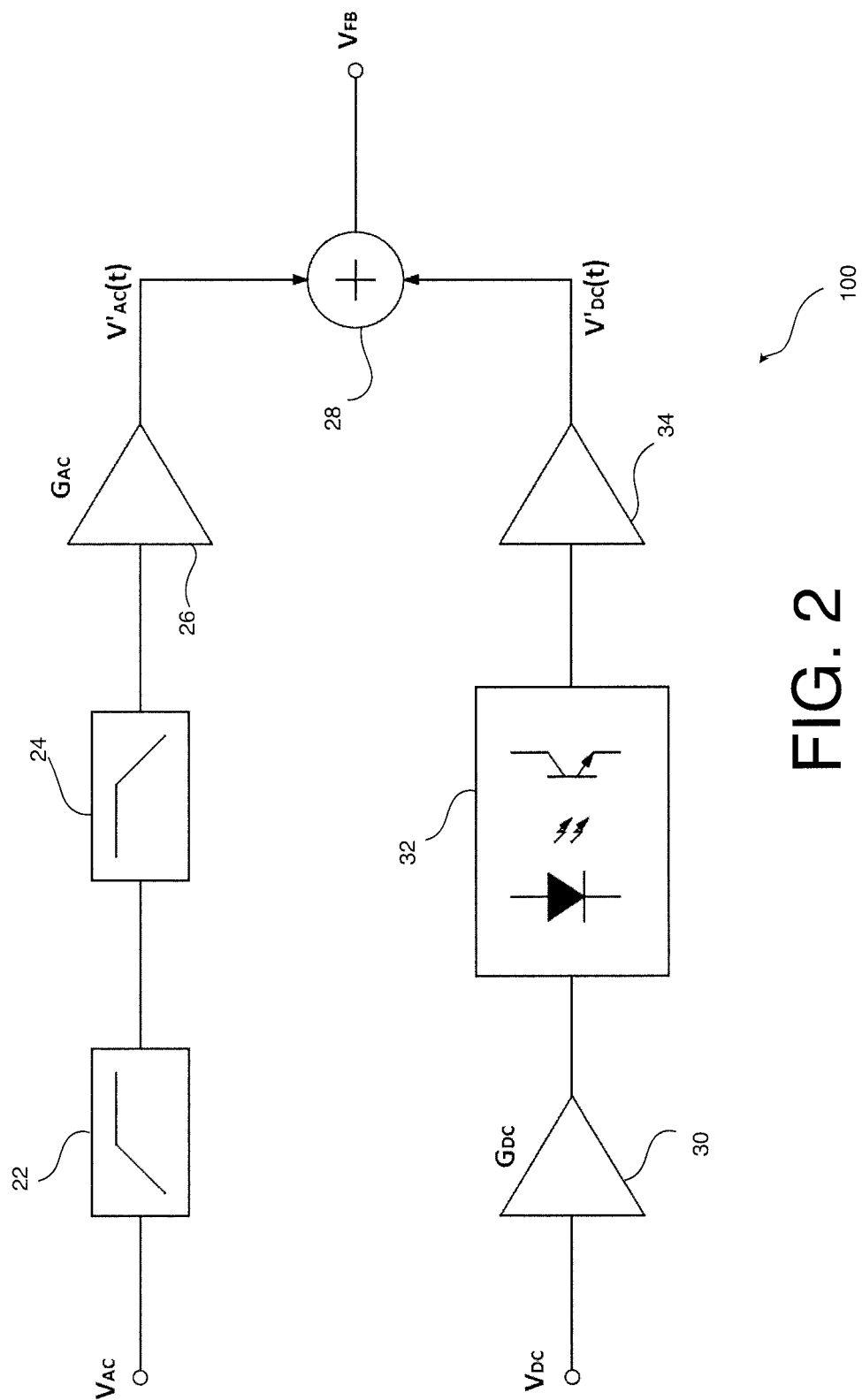
FIG. 2 is a schematic view of a control loop of the switching converter circuit of FIG. 1.

With particular reference to the embodiment illustrated in FIG. 2, the control loop 100 comprises a first input terminal $V_{AC}$ connected at the common node in common to the two MOSFET $Q_H$ attack $Q_L$, and a second input terminal $V_{DC}$ connected to the resistance $R_s$. The control loop 100 further comprises a high pass filter 22 connected to the first input terminal Vac of the control loop 100, a low pass filter (24) connected to the high pass filter 22, a first amplification block 26 with gain $G_{AC}$ connected to the low pass filter 24, and a summing node 28 connected to the first amplification block 26.

The control loop 100 further comprises a second amplification block 30 with gain $G_{AC}$ connected to the second input terminal $V_{DC}$ of the control loop 100, an optoisolator 32 connected to the second amplification block 30, a signal decoupling stage 34 (buffer) connected to the optoisolator 32 and to the summing node 28.

The control loop 100 lastly comprises an output terminal $V_{FB}$ connected to the integrated control circuit 20.

According to the present invention, in order to carry out a power conversion passing from a continuous voltage value, $V_{DCbus}(t)$, at a controlled direct current value $I_{led}(t)$ with the above-described circuit, an indirect reconstruction method of the waveform that would be obtained if it were possible to carry out the measurement of the current $IL_m(t)$ flowing in the magnetising inductance $L_m$ is necessary.

With reference to FIGS. 4a to 4f, the current $IL_m(t)$ can be broken down into two components, a direct component and a frequency component. The direct component corresponds to the average value of the current $I_{led}$ in output from the first output terminal OUT1, while the component in frequency is a triangular wave having a nil average value, and which during the on stage ($T_{on}$) has a positive slope with a coefficient of $$\frac{VDCbus - Vled}{Lm}$$

and during the off stage ($T_{off}$) it has a negative slope with a coefficient of $$\frac{Vled}{Lm}$$

The method therefore comprises steps of:
measuring a voltage $V_{AC}(t)$ on the terminal $V_{AC}$ connected to the node in common with the two MOSFET $Q_H$ and $Q_L$ (square waveform),
subtracting, from the voltage measurement ($V_{AC}(t)$), the mean value via the high pass filter (22) with a much greater time constant ($\tau_{HP}$) than the switching period ($T_{on}+T_{off}$),
filtering, via the low pass filter (24), the waveform in output from the high pass filter (22) with a much greater time constant ($\tau_{HP}$) than the switching period ($T_{on}+T_{off}$), obtaining a triangular waveform.
amplifying, via the first amplification block 26 with a gain $G_{AC}$, the waveform in output from the low pass filter (24), and
sending, to the summing node 28, the waveform $V'_{AC}(t)$ in output from the first amplification block 26.

The waveform $V'_{AC}(t)$ will have a triangular progression, exactly like the frequency component of the current flowing in the magnetising inductance $L_m$ and the slopes during the on and off stage will respectively be first positive and then negative with the following coefficients.

$$\left(\frac{VDCbus - Vled}{\tau_{LP}}\right) \times G_{AC}$$

and $$\left(\frac{Vled}{\tau_{LP}}\right) \times G_{AC}$$

The method therefore comprises steps of:
measuring a current in output from the converter circuit 1 by measuring the voltage $V_{DC}(t)$ at the heads of the measuring resistance $R_s$,
amplifying and filtering the measure of the voltage ($V_{DC}(t)$ via the second amplification block 30 with a gain $G_{DC}$,
transmitting the waveform $V'_{DC}(t)=I_{LED}\times R_s \times G_{DC}$ in output from the amplification block 30 to the summing node 28 via the optoisolator 32.

As in output from the summing node 28 by predetermined dimensioning of the multiplication factors $G_{DC}$ and $G_{AC}$, it is possible to obtain a waveform $V_{FB}(t)=V'_{AC}(t)+V'_{DC}(t)$ identical to that which would be obtained by direct measuring of the current flowing in the magnetising inductance $L_m$, it is possible to control the average value of the output magnitude $I_{led}(t)$ of the converter circuit 1 of the present invention in a hysteretic way by using the integrated control circuit 20, and it is possible to use the voltage $V_{FB}(t)$ as a control magnitude by following the hysteretic control methods of known type.

In an embodiment of the present invention, the above-described method can also comprise a step of decoupling the result of the amplification and the filtering of the voltage measurement $V_{DC}(t)$ in output from the optoisolator 32 via the signal decoupling stage of the 34 before sending it to the summing node 28.

In a further aspect of the present invention the switching converter circuit can be used in a continuous conduction mode (CCM). With this solution the RMS values of the current can be considerably reduced, therefore improving the parameters of electromagnetic inference ("EMI").

Figure 3:
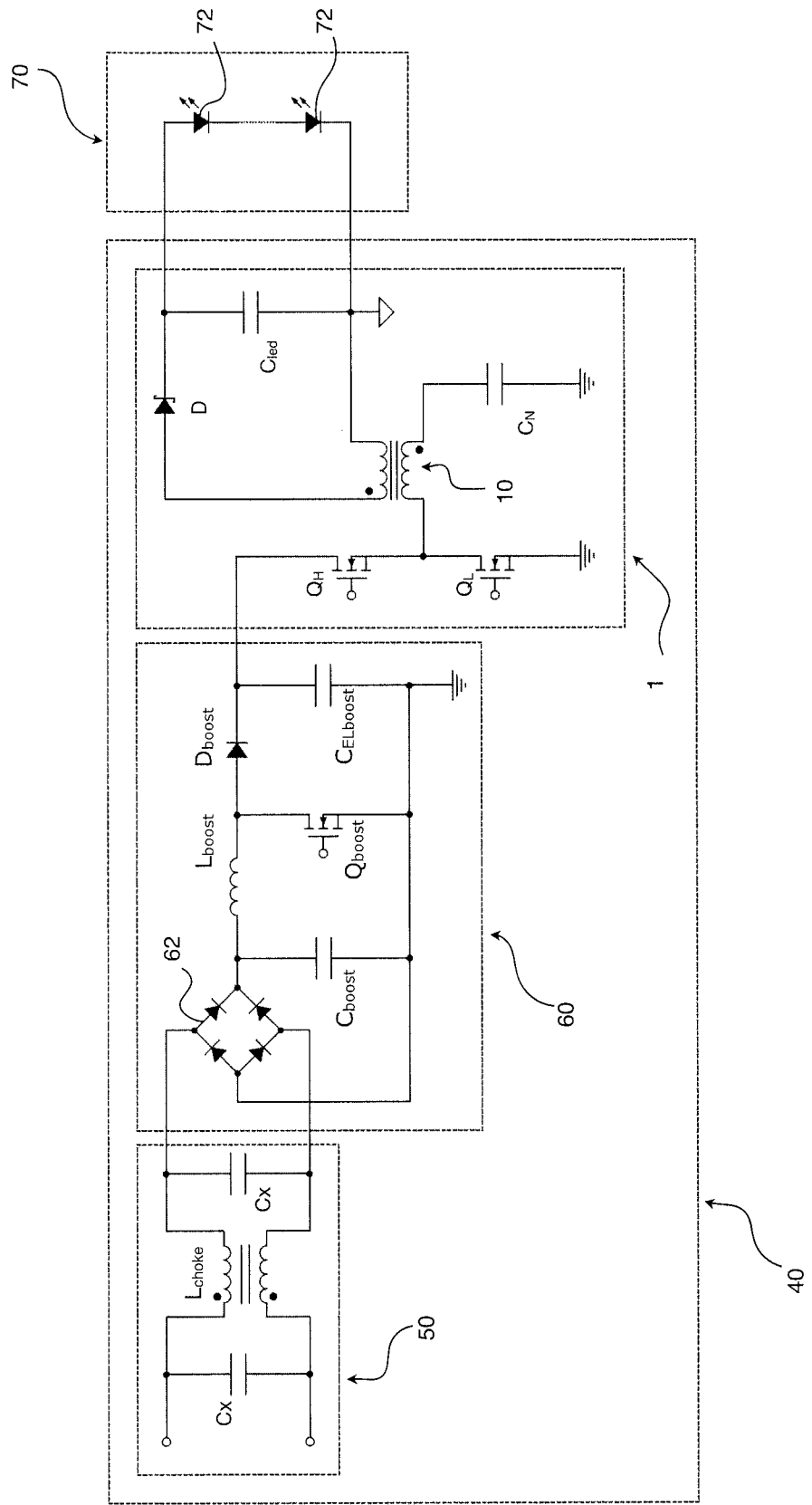
FIG. 3 is a schematic view of a circuit of a power supply of LED light source.
Figure 4A:
FIGS. 4a to 4f are a schematic representation of the waveforms present in the circuit of the present invention.
Figure 4B:
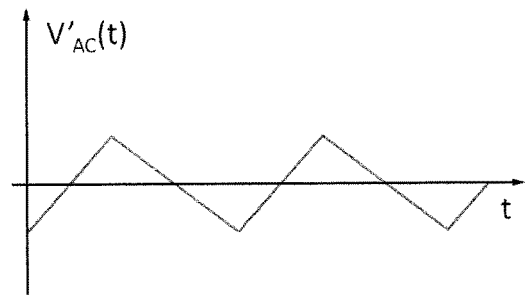
Figure 4C:
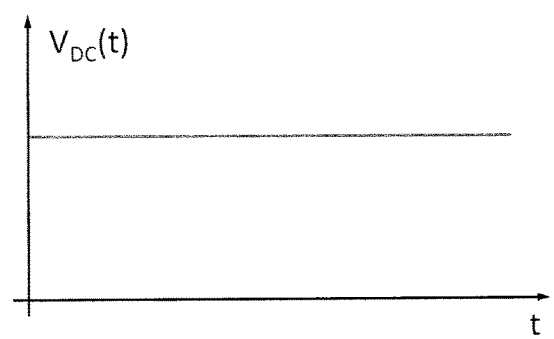
Figure 4D:
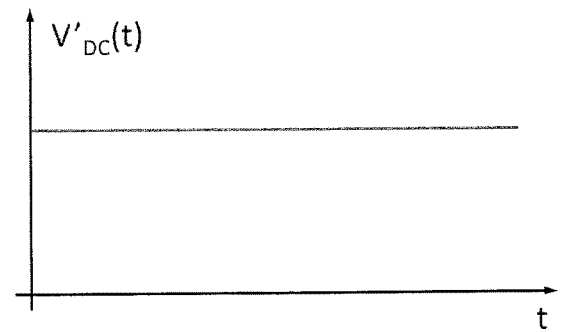
Figure 4E:
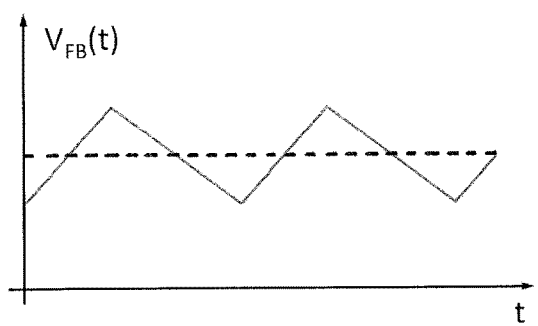
Figure 4F:
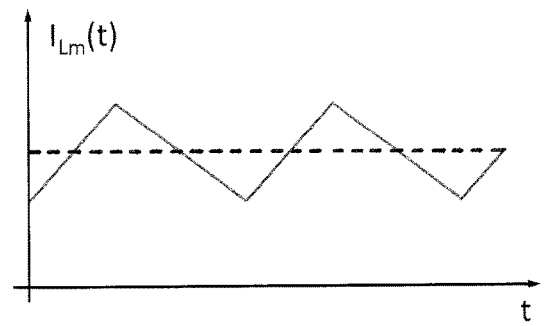

As indicated in the preamble of the present description, the converter 1 circuit of the present invention is particularly suited to being used as a second stage of power conversion, or output stage, of a power supply for LED light sources. With particular reference to FIG. 3, a power supply 40 for LED light sources comprises a first EMI filter stage 50, a second active rephasing stage 60, and a circuit converter 1 according to the present invention. The power supply 40 is connected to a LED light source 70.

In greater detail, the EMI filter stage 50 is a passive filter that enables the electronic devices to respond to the rules of electromagnetic compatibility, and includes a filter π composed of a common mode choke coil $L_{choke}$ and a pair of capacitors Cx in class X.

The active rephasing stage 60 carries out the power conversion from the sinusoidal mode (AC) to the direct mode (DC), while keeping the power factors (PF) and the total harmonic distortion (THD) close to the ideal values. Generally this is a BOOST converter able to produce a controlled voltage continuous output at about 400 Volts. The active rephasing stage 60 includes a complete diode bridge 62 for rectification of the grid voltage (PNT), a first capacitor $C_{boost}$ for the filtering of the high-frequency components generated during the conversion, a MOSFET $Q_{boost}$ which, controlled by an integrated circuit $IC_{boost}$, enables energy accumulation in an inductor $L_{boost}$ during the on phase ($T_{onboost}$), i.e with the MOSFET $Q_{boost}$ closed.

During the off stage ($T_{offboost}$), i.e. with the MOSFET $Q_{boost}$ open, the energy is transferred onto a second capacitor $C_{ELboost}$ and onto the output via a diode $D_{boost}$. Note that the integrated circuit $IC_{boost}$ is able to control this energy transfer so that it passes from the sinusoidal mode to the direct mode while maintaining the phase shift between current absorbed from the grid and the grid voltage.

The LED light source 70, which constitutes the electrical load of the power supply 40, comprises one or more LEDs 72 and requires a low ripple direct current.

In a further aspect of the present invention the value of the controlled magnitude in output, i.e. the current, can be changed by acting on the switching times ratio $$\left(\frac{T_{on}}{T_{on}+T_{off}}\right).$$

With this solution it is possible to considerably improve the voltage dynamic in output.

Though the invention has been developed with particular regard, though not limitedly, to a switching converter circuit, i.e. a switching converter, particularly suitable for use as a second stage of power conversion, or output stage, of a transformer for LED light sources, a technical expert in the sector might easily use the converter circuit 1 of the present invention in different electronic devices, such as in power supplies for different electrical loads, for example for electrical and/or electronic apparatus different to a light source and/or a LED light source.

All the details can be substituted by other technically-equivalent elements. Likewise, the materials used, as well as the forms and dimensions thereof, can be any according to needs without for this reason forsaking the scope of protection of the following claims.

The invention claimed is:

1. A switching converter circuit (1) for driving a LED (72) comprising:
    at least an input terminal ($IN_1$) for connecting to a continuous voltage source ($V_{DCbus}$),
    a pair of output terminals ($OUT_1$, $OUT_2$),
    a pair of field effect transistors ($Q_H$, $Q_L$) connected in series between the input terminal ($IN_1$) and a reference terminal of the switching converter circuit,
    a pair of coupled inductors (10) having a first pole connected to a common node of the field effect transistors ($Q_H$, $Q_L$), a second pole connected to the reference terminal through a capacitor ($C_n$), a third pole connected to the second output terminal ($OUT_2$) and a fourth pole connected to first the output terminal ($OUT_1$) through a diode (D),
    an integrated control circuit (20) connected to the field effect transistors ($Q_H$, $Q_L$) for controlling an output current ($I_{LED}$) of the converter circuit (1),
    a control loop (100), and
    a measure resistance ($R_s$) connected to the second output terminal (OUT2) and to the third pole of the pair of coupled inductors (10),
    characterized in that
    the control loop (100) comprises a first input terminal ($V_{AC}$) connected to said common node for measuring a first voltage ($V_{AC}(t)$), a second input terminal ($V_{DC}$) connected to the measuring resistance ($R_s$) for measuring a second voltage ($V_{DC}(t)$), and an output terminal ($V_{FB}$) connected to the integrated control circuit (20) for providing a third voltage ($V_{FB}(t)$) thereto, the control loop (100) further comprising:
    a first control loop branch (22,24,26) connected to the first input terminal ($V_{AC}$) and configured to provide a first waveform ($V'_{AC}(t)$) having a triangular progression having a corresponding to the frequency component of a current flowing in a magnetising inductance ($L_m$) of a model of the pair of coupled inductors (10), based on the first voltage ($V_{AC}(t)$);
    a second control loop branch (30,32,34) connected to the second input terminal ($V_{DC}$) and configured to provide a second waveform ($V'_{DC}(t)$) proportional to a direct component current flowing in a magnetising inductance ($L_m$) of a model of the pair of coupled inductors (10) based on the second voltage ($V'_{DC}(t)$), and
    a summing node (28) connected to the first control loop branch (22,24,26), to the second control loop branch (30,32,34) and to the output terminal ($V_{FB}$), the summing node (28) being configured to combine the first waveform ($V'_{AC}(t)$) with the second waveform ($V'_{DC}(t)$) for providing the third voltage ($V_{FB}(t)$), and wherein the integrated control circuit (20) is arranged for implementing a hysteretic current control of the average value of the output current ($I_{LED}$) using the third voltage ($V_{FB}(t)$) as a control magnitude.

2. The circuit of claim 1, characterised in that the field effect transistors are MOSFET.

3. The circuit of claim 1, characterised in that the first control loop branch (22,24,26) of the control loop (100) comprises:
    a high pass filter (22) connected to the first input terminal ($V_{AC}$),
    a low pass filter (24) connected to the high pass filter (22),
    a first amplification block (26) connected to the low pass filter (24).

4. The circuit of claim 3, characterised in that the second control loop branch (30,32,34) of the control loop (100) further comprises:
    a second amplification block (30) connected to the second input terminal ($V_{DC}$),
    an optoisolator (32) connected to the second amplification block (30) and the summing node (28).

5. The circuit of claim 4, characterised in that it comprises a signal decoupling stage (34) connected to the optoisolator (32) and to the summing node (28).

6. A LED light source power supply comprising a switching converter circuit as defined in claim 1.

7. Method for controlling a switching converter circuit (1) for driving a LED (72) comprising a pair of field effect transistors ($Q_H$, $Q_L$) connected in series between the input terminal ($IN_1$), a reference terminal of the switching converter circuit and a pair of coupled inductors (10) connected to a common node of the field effect transistors ($Q_H$, $Q_L$) and an integrated control circuit (20) connected to the field effect transistors ($Q_H$, $Q_L$) for controlling an output current (LED) provided at a pair of output terminals ($OUT_1$, $OUT_2$) of the switching converter circuit (1), the method comprising:
    measuring a first voltage ($V_{AC}(t)$) at the common node of the field effect transistors;
    providing a first waveform ($V'_{AC}(t)$) having a triangular progression having a corresponding to the frequency component of a current flowing in a magnetising inductance (Lm) of a model of the pair of coupled inductors (10), based on the measuring of the first voltage ($V_{AC}(t)$);

measuring a second voltage ($V'_{DC}(t)$) at the output terminals;

providing a second waveform ($V'_{DC}(t)$) proportional to a direct component current flowing in a magnetising inductance (Lm) of a model of the pair of coupled inductors (10) based on the measuring of the second voltage ($V_{DC}(t)$);

combining the first waveform ($V'_{AC}(t)$) with the second waveform ($V'_{DC}(t)$) for providing a third voltage ($V_{FB}(t)$), and activating alternatively each field effect transistor of the pair of field effect transistor based on the third voltage in order to control in a hysteretic way the average value of the output current.

8. The method of claim 7, wherein the switching converter circuit further comprises a control loop (100), and a measure resistance ($R_s$) connected to the second output terminal (OUT2) and to the third pole of the pair of coupled inductors (10), wherein the control loop (100) comprises a first input terminal ($V_{AC}$) connected to said common node for measuring a first voltage ($V_{AC}(t)$), a second input terminal ($V_{DC}$) connected to the measuring resistance ($R_s$) for measuring a second voltage ($V_{DC}(t)$), and an output terminal ($V_{FB}$) connected to the integrated control circuit (20) for providing a third voltage ($V_{FB}(t)$) thereto, the control loop (100) further comprising a first control loop branch (22,24,26) connected to the first input terminal ($V_{AC}$) and configured to provide a first waveform ($V'_{AC}(t)$) having a triangular progression having a corresponding to the frequency component of a current flowing in a magnetising inductance ($L_m$) of a model of the pair of coupled inductors (10), based on the first voltage ($V_{AC}(t)$), a second control loop branch (30,32,34) connected to the second input terminal ($V_{DC}$) and configured to provide a second waveform ($V'_{DC}(t)$) proportional to a direct component current flowing in a magnetising inductance ($L_m$) of a model of the pair of coupled inductors (10) based on the second voltage ($V_{DC}(t)$), and a summing node (28) connected to the first control loop branch (22,24,26), to the second control loop branch (30, 32,34) and to the output terminal ($V_{FB}$), the summing node (28) being configured to combine the first waveform ($V'_{AC}(t)$) with the second waveform ($V'_{DC}(t)$) for providing the third voltage ($V_{FB}(t)$), wherein the first control loop branch (22,24,26) of the control loop (100) comprises a high pass filter (22) connected to the first input terminal ($V_{AC}$), a low pass filter (24) connected to the high pass filter (22), a first amplification block (26) connected to the low pass filter (24), a signal decoupling stage (34) connected to the optoisolator (32) and to the summing node (28), wherein the second control loop branch (30,32,34) of the control loop (100) further comprises a second amplification block (30) connected to the second input terminal ($V_{DC}$), an optoisolator (32) connected to the second amplification block (30) and the summing node (28), wherein the switching converter circuit further comprises a signal decoupling stage (34) connected to the optoisolator (32) and to the summing node (28), and wherein providing a first waveform ($V'AC(t)$) comprises:
  subtracting, from the first voltage ($V_{AC}(t)$), the mean value thereof,
  low-pass filtering the waveform in output from the high pass filter (22) with a much greater time constant ($\tau_{HP}$) than the switching period ($T_{on}+T_{off}$), and
  amplifying the waveform in output from the low pass filter.

9. The method of claim 8, characterised in that providing a second waveform ($V'DC(t)$) comprises:
  amplifying the second voltage ($V_{DC}(t)$), and
  filtering the amplified second voltage ($V_{DC}(t)$).

* * * * *